United States Patent [19]
Wrightman

[11] Patent Number: 5,778,950
[45] Date of Patent: Jul. 14, 1998

[54] PLANER ATTACHMENT

[76] Inventor: Ronald A. Wrightman, Box 25, 1 Kevin Crescent, Bracebridge, Ontario, Canada, P1L 1A7

[21] Appl. No.: 792,654

[22] Filed: Jan. 31, 1997

[51] Int. Cl.$^6$ .................. B23C 1/20; B27C 5/10
[52] U.S. Cl. .................. 144/48.6; 144/154.95; 30/475; 409/175; 409/178; 451/344
[58] Field of Search .................. 144/1.1, 48.5, 144/48.6, 136.95, 154.5; 409/175, 178, 180–182; 30/475, 476, 477; 451/344, 345, 346

[56] References Cited

U.S. PATENT DOCUMENTS

| | | | |
|---|---|---|---|
| 3,027,688 | 4/1962 | Zabransky | 451/344 |
| 3,207,195 | 9/1965 | Anton | 30/475 |
| 4,977,938 | 12/1990 | Greeson | 409/182 |
| 5,249,614 | 10/1993 | Osborn | 409/182 |
| 5,452,751 | 9/1995 | Engler, III et al. | 144/48.6 |

*Primary Examiner*—W. Donald Bray
*Attorney, Agent, or Firm*—Ladas & Parry

[57] ABSTRACT

A support for a number of portable machine tools, such as planers, has a planer mounting member with an aperture to provide access to the workpiece for the tool bit of each tool. The tools are releasably secured to the mounting member and can be retained in alignment on the mounting member to perform multiple operations in a single pass.

7 Claims, 7 Drawing Sheets

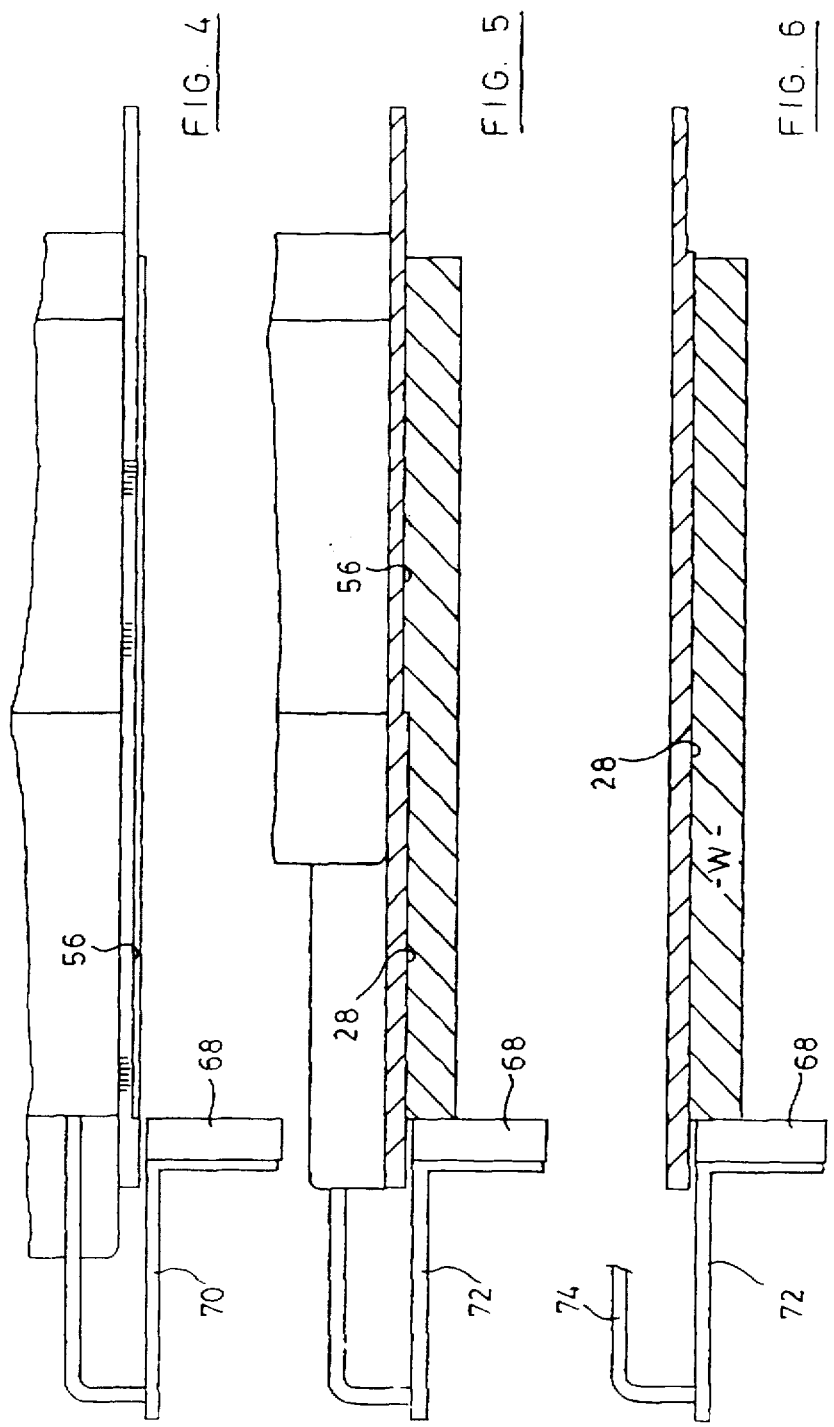

PLANER ATTACHMENT

The present invention relates to a support that permits the mounting of a plurality of portable machine tools in a ganged array for conjoint operation on a workpiece.

Portable machine tools are widely used in the construction industry. The trend has been for such tools to become more compact and lighter to facilitate their use and to reduce their cost. There are, however, situations in which portable tools with larger capacities are required but the limited demand for such tools significantly increases their cost. However, the absence of a suitable tool causes significant inconvenience and frustration.

A typical application where this problem is apparent is in planing a surface of a board or beam. Such a surface will have a width of at least 3½ inches but in many applications, typically in log home construction, the dimensions of the lumber are nominally 8, 10 or 12 inches. The planers that are readily available at moderate cost provide a 3¼ inch width of cut which is insufficient to plane even conventional 2×4 lumber. It is impractical to dress the lumber with successive passes as the alignment of the plane on the workpiece is critical and cannot be achieved without extreme care.

It is therefore an object of the present invention to obviate or mitigate the above disadvantages.

In general terms, the present invention provides a support to mount a plurality of portable machine tools in a ganged array for conjoint operation on a workpiece. The support comprises a generally planar mounting member having upper and lower surfaces. The upper surface receives the machine tools and the lower surface is engageable with the workpiece. The member includes a plurality of apertures, one associated with each of the tools, that permits access of the tool bit to the workpiece. A retainer is provided on the mounting member to secure releasably the tools to the member.

Embodiments of the invention will now be described by way of example only, with reference to the accompanying drawings, in which FIG. 1 is a perspective view of a support with a pair of planers attached;

FIG. 4 is a view in the direction of arrow 4 in FIG. 1;

FIG. 5 is a view on the line 5—5 of FIG. 1;

FIG. 6 is a view on the line 6—6 of FIG. 1;

Figure 1:
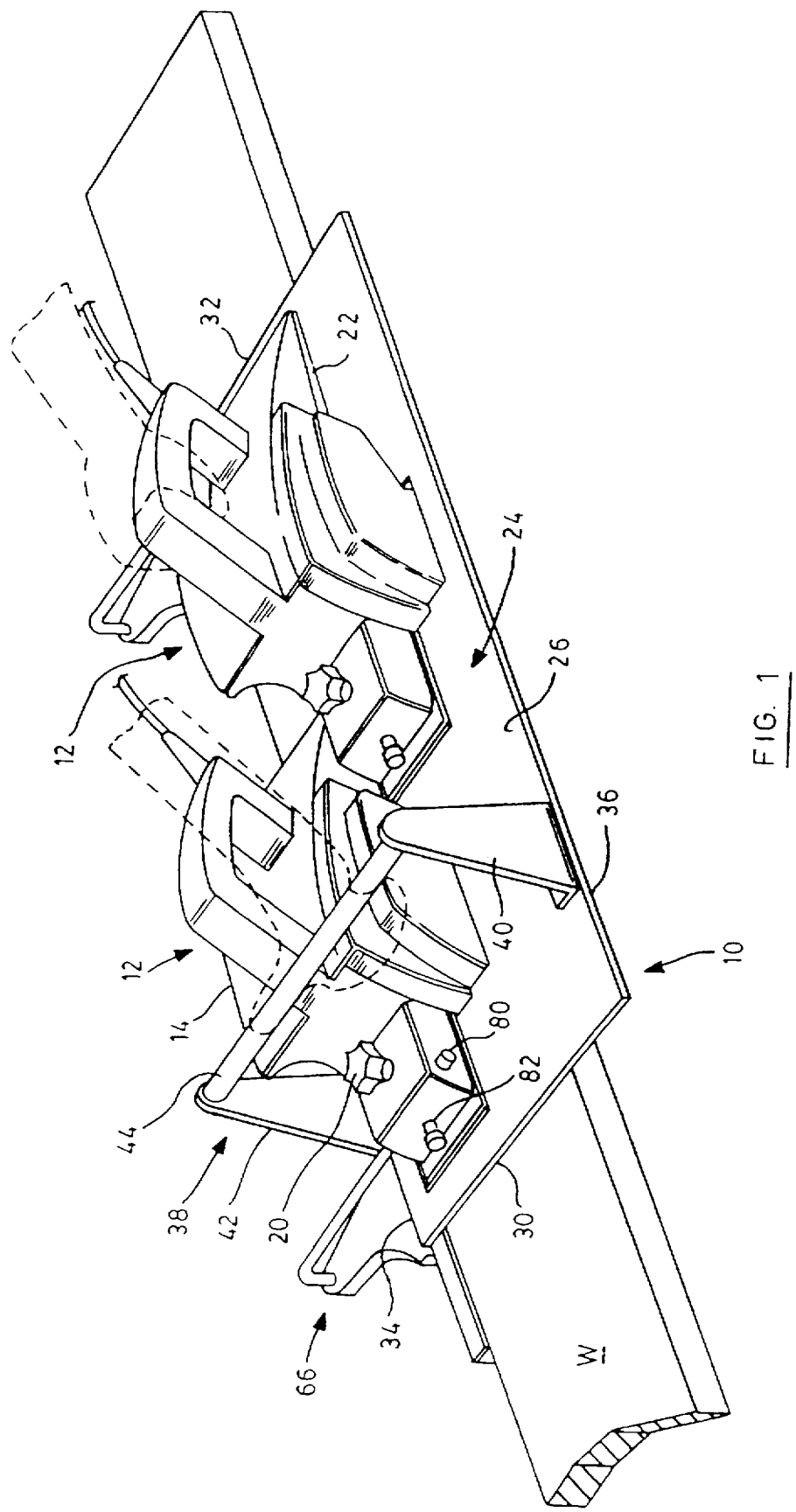

Referring therefore to the drawings, a support generally indicated at 10 is arranged to mount a plurality of portable planers 12 for conjoint operation upon a workpiece indicated at W. Each of the planers 12 is of well-known construction and includes a body 14, a cutter assembly 16, and an adjustable shoe 18. The height of the shoe 18 may be varied by means of adjustment knob 20 to vary the depth of the cut made by the cutter assembly. The cutter assembly 16 is rotated by means of an electrical motor located within the body 14 and upon engagement of the workpiece W will dress the surface of the workpiece.

The body 14 includes a base plate 22 to which a fixed shoe is conventionally attached by means of counter sunk screws.

The support 10 includes a generally planar mounting member 24 having an upper surface 26 and a lower surface 28. The upper and lower surfaces 26,28 are delimited by a leading edge 30 and trailing edge 32 interconnected by respective lateral edges 34,36.

A handle 38 is secured to the mounting member adjacent the leading edge 30. The handle 38 includes a pair of uprights 40,42 with a horizontal bar 44 extending between and above the upper surface 26.

The mounting member includes a pair of apertures 46,48 that are identical in shape and are configured to receive the adjustable shoe 18 and cutter assembly 16 of the planar. The apertures 46,48 are generally rectangular with an offset 50 to accommodate a projection of the drive train to the cutter assembly. It will of course be appreciated that the shape of the apertures 46,48 will vary depending upon the nature of the machine tool and the manufacturer of the tool to be supported upon the mounting member 24.

Figure 3:
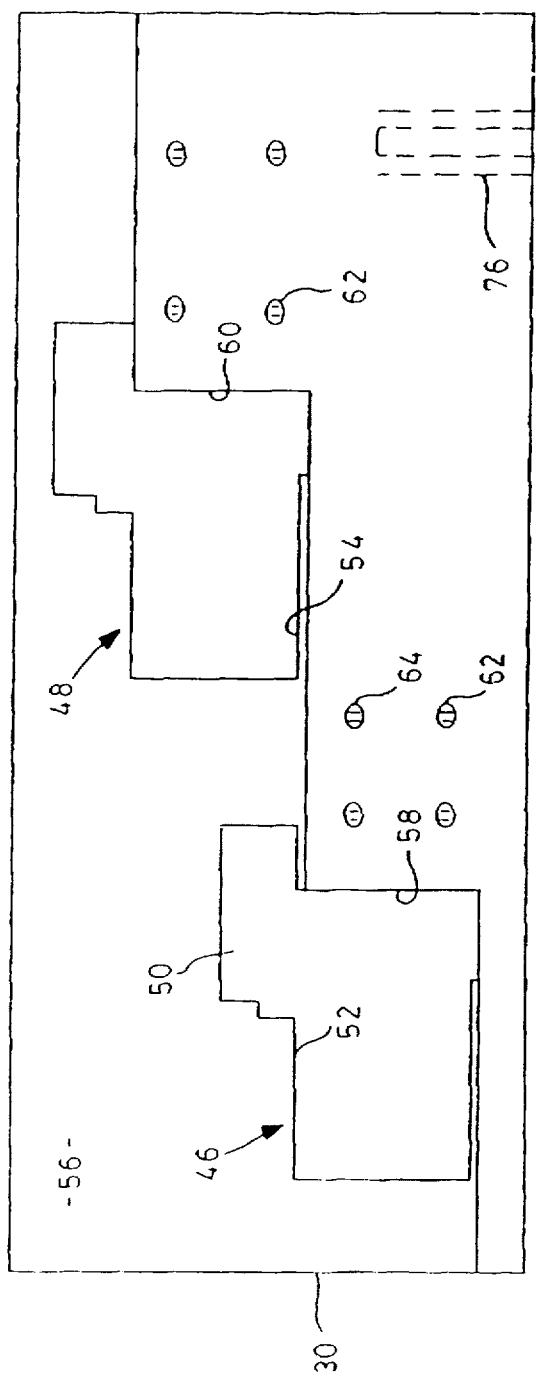
FIG. 3 is a bottom view of the support shown in FIG. 1.

As can be seen in FIG. 3, the apertures 46,48 are longitudinally spaced from the leading edge 30 and laterally offset from one another. The lateral offset is chosen such that the cutter assemblies are laterally contiguous. Accordingly, an inner lateral edge 52 of the aperture 46 is aligned with an inner lateral edge 54 of the aperture 48 such that there is a slight overlap between the cutter assemblies mounted in the apertures 46,48.

Figure 2:
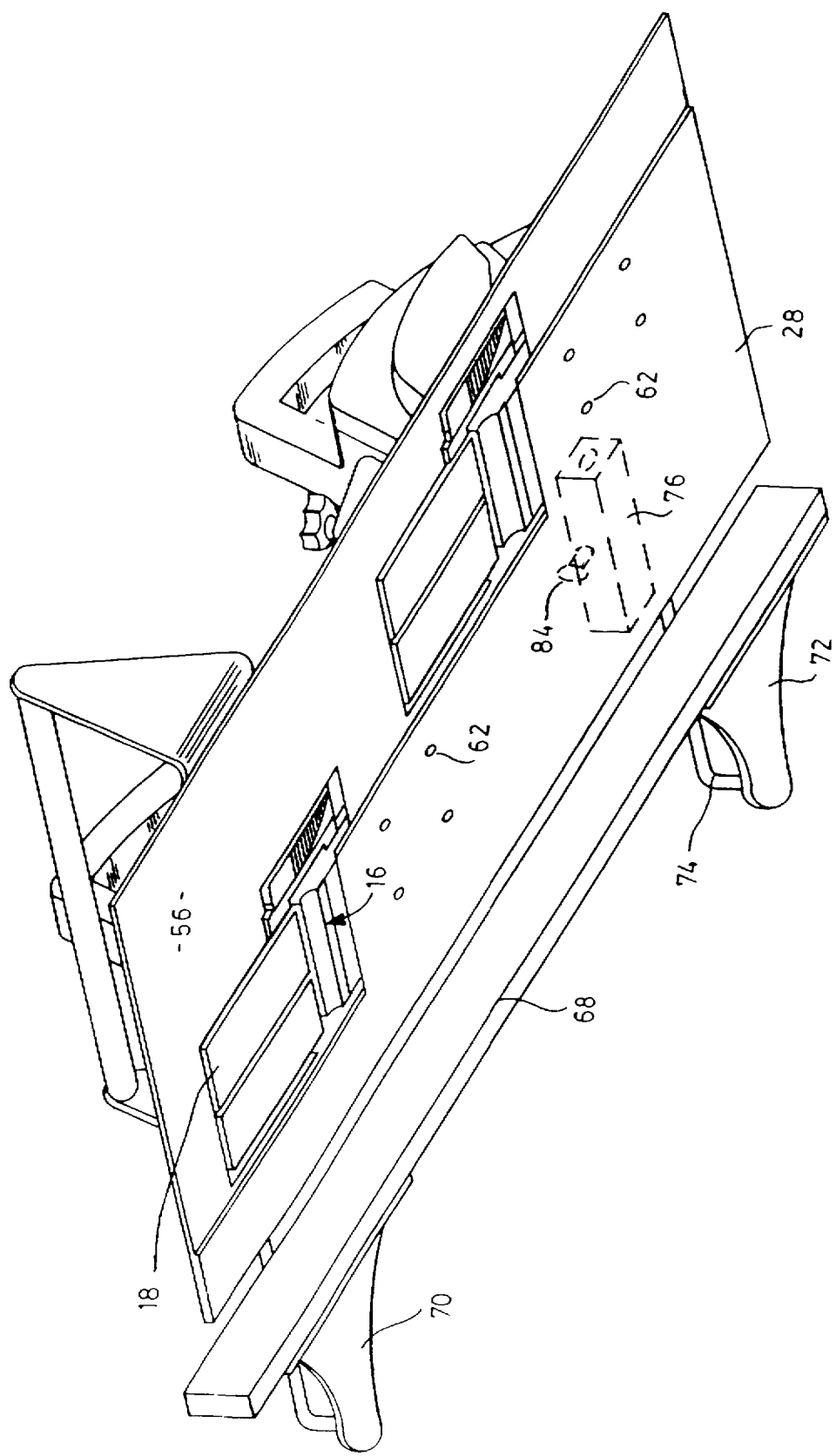
FIG. 2 is an under view of the support shown in FIG. 1.

As can best be seen in FIG. 2, the lower surface 28 is stepped to provide a relieved portion 56 extending from the leading edge 30 to each of the apertures 46,48. The relieved portion includes each of the apertures 46,48 so that the lower surface 28 at the trailing edge 58,60 of each of the apertures 46,48 is proud of the leading edge of each of the apertures. The mounting member 24 includes a pattern of holes 62 that correspond to the pattern of holes on the base plate 22 of each of the planers to receive counter sunk screws 64 to secured the planers to the support member 24.

A fence assembly 66 is located along a lateral edge of the support member 24 and includes a longitudinal fence 68 supported by a pair of brackets 70,72. The brackets 70,72 each have a lateral bar 74 that projects over the mounting member 24. A boss 76 is located adjacent the trailing edge 32 to receive the rearward of bars 74 and fastened with a thumb screw 84. The forward rod 74 is received within a bore 80 provided in the body of the planer 14 and secured with a thumbscrew 82. The fence assembly 68 is laterally adjustable relative to the mounting member 24 and may be secured in position by adjustment of the thumbscrews 82 on the bosses 78.

To assemble the support and planers, the fixed plates are removed from the base plate 22 of each of the planers and the planers' positioned with the adjustable shoes 18 and cutter assembly 16 in the apertures. In this position, the threaded bores in the base plate 22 will be aligned with the holes 62 and the screws 64 may be inserted to retain the planer 14 on the mounting member 24. With the planers in position, the adjustable shoes 18 are set to provide a common depth of cut between the planers and the fence assembly 66 adjusted so as to position the planers at the desired position on the workpiece W. The thickness of the support member 24 is closer to correspond o the thickness of the fixed sleeve so that the relationship between the cutter assembly and support on the workpiece is maintained. The planers may then be activated utilizing the switches provided in the planers and the support moved along the workpiece to plane the upper surface. The positioning of the planers in echelon provides successive passes for the cutter assemblies so that a continuous smooth surface is provided. The handle 38 permits manipulation of the mounting plate 24 as it progresses it along the workpiece W.

It will be seen, therefore, that the two planers 14, each of which is relatively inexpensive but of limited utility, are conjointly supported by the mounting member 24 so that they may be used as a unit.

Figure 7:
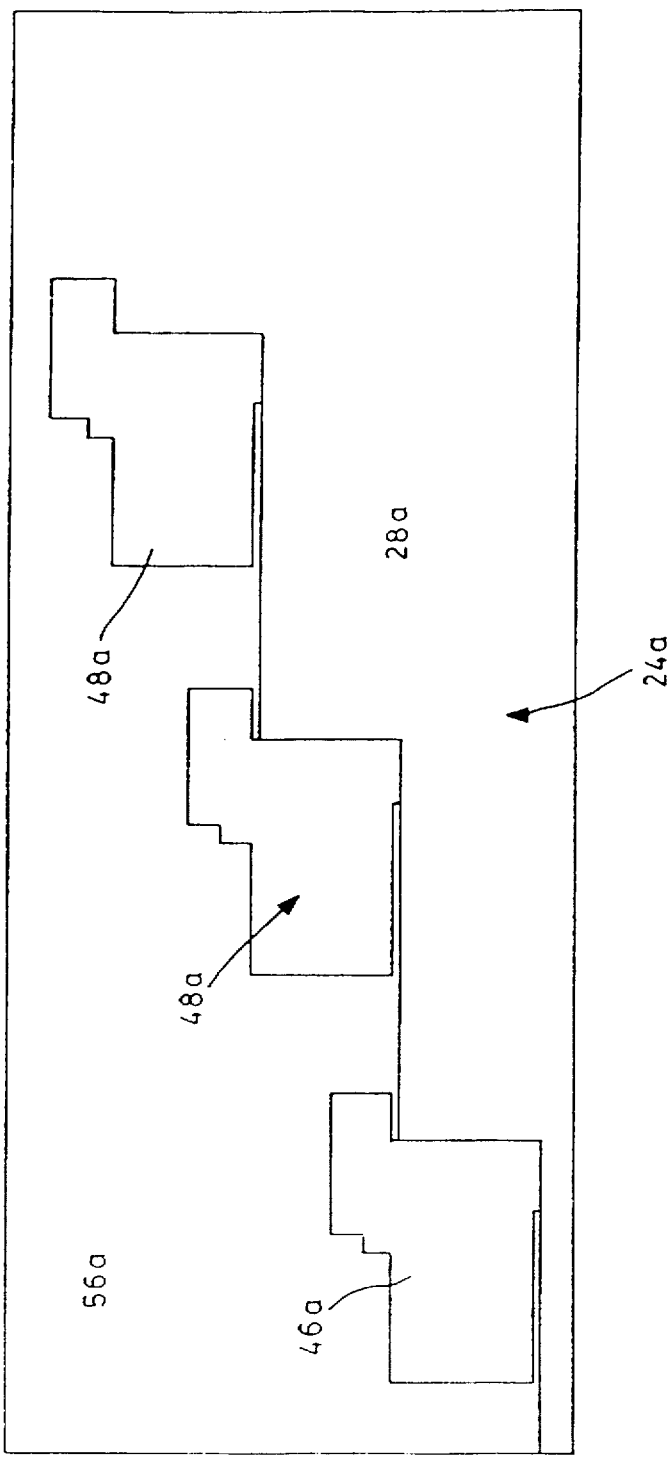
FIG. 7 is a view similar to FIG. 3 of an alternative embodiment utilizing three planers.

It is of course possible to utilize more than two of the planers 14 and as shown in FIG. 7, three planers may be combined on a common mounting plate 24a to provide a width of cut in the order of 9¾ inches. This permits a 10 inch nominal timber to be dressed in a single pass.

Figure 8:
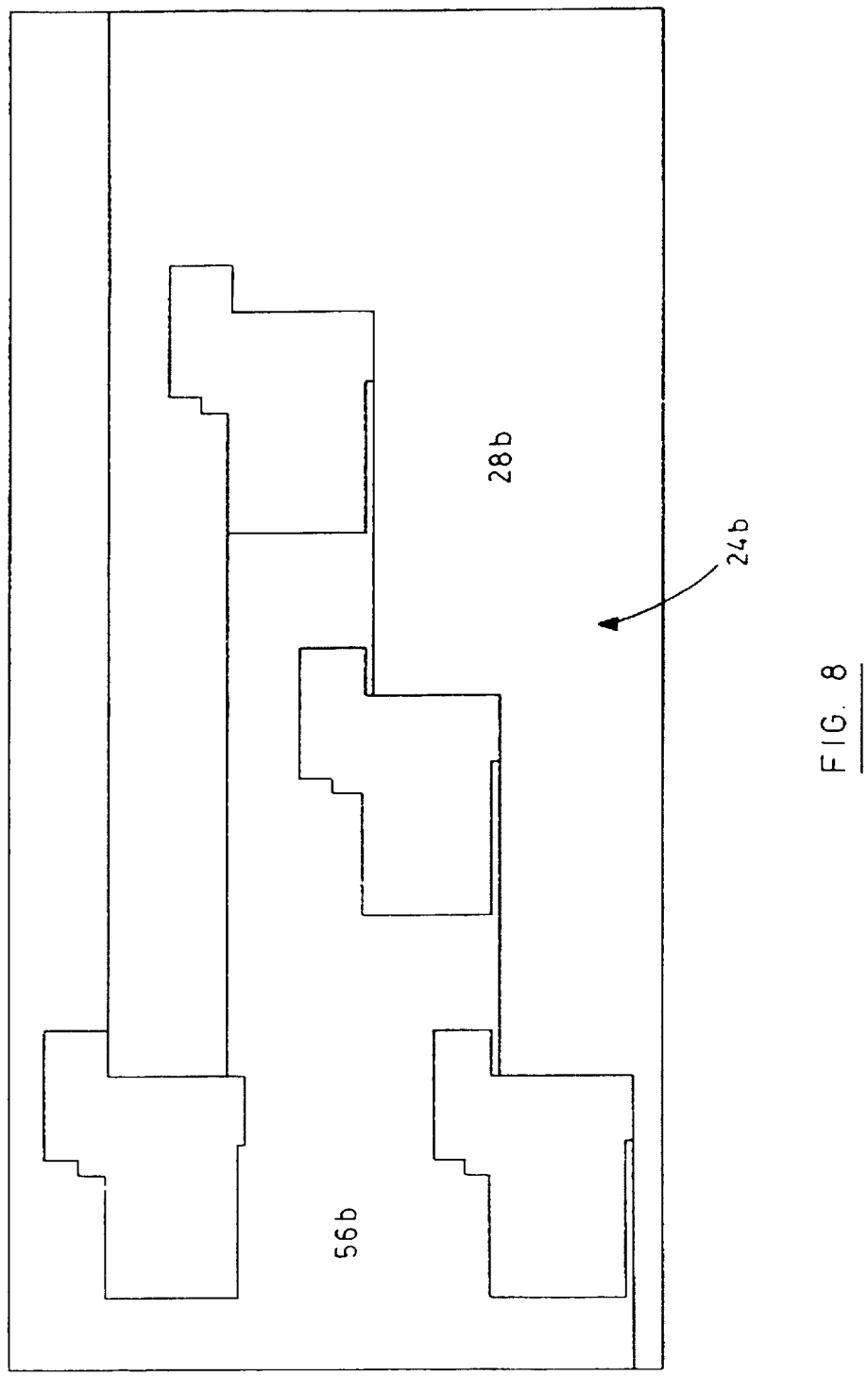
FIG. 8 is a view similar to FIG. 7 of a further embodiment utilizing four planers.

Similarly, a nominal 12 inch dimensional lumber may be dressed utilizing four planers mounted on a common support plate 24b shown in FIG. 8. In this arrangement, an aperture is associated with each of the planers but the laterally outer planers are laterally offset but longitudinally aligned. The space in between the planers is covered by the longitudinally spaced intermediate planers so that a full surface may be dressed in a single pass. The positioning of the laterally offset planers in longitudinal alignment enhances the portability of the unit by placing the weight adjacent the handle assembly 38.

The under surface is recessed from the leading edge to the rear of the apertures to allow the adjustable shoes to control the depth of cut.

In each of the above embodiments, the machine tools are shown as planers. However, alternative machine tools may be supported upon the mounting member such as a router or saw, provided an appropriate aperture and mounting points are provided.

Figure 9:
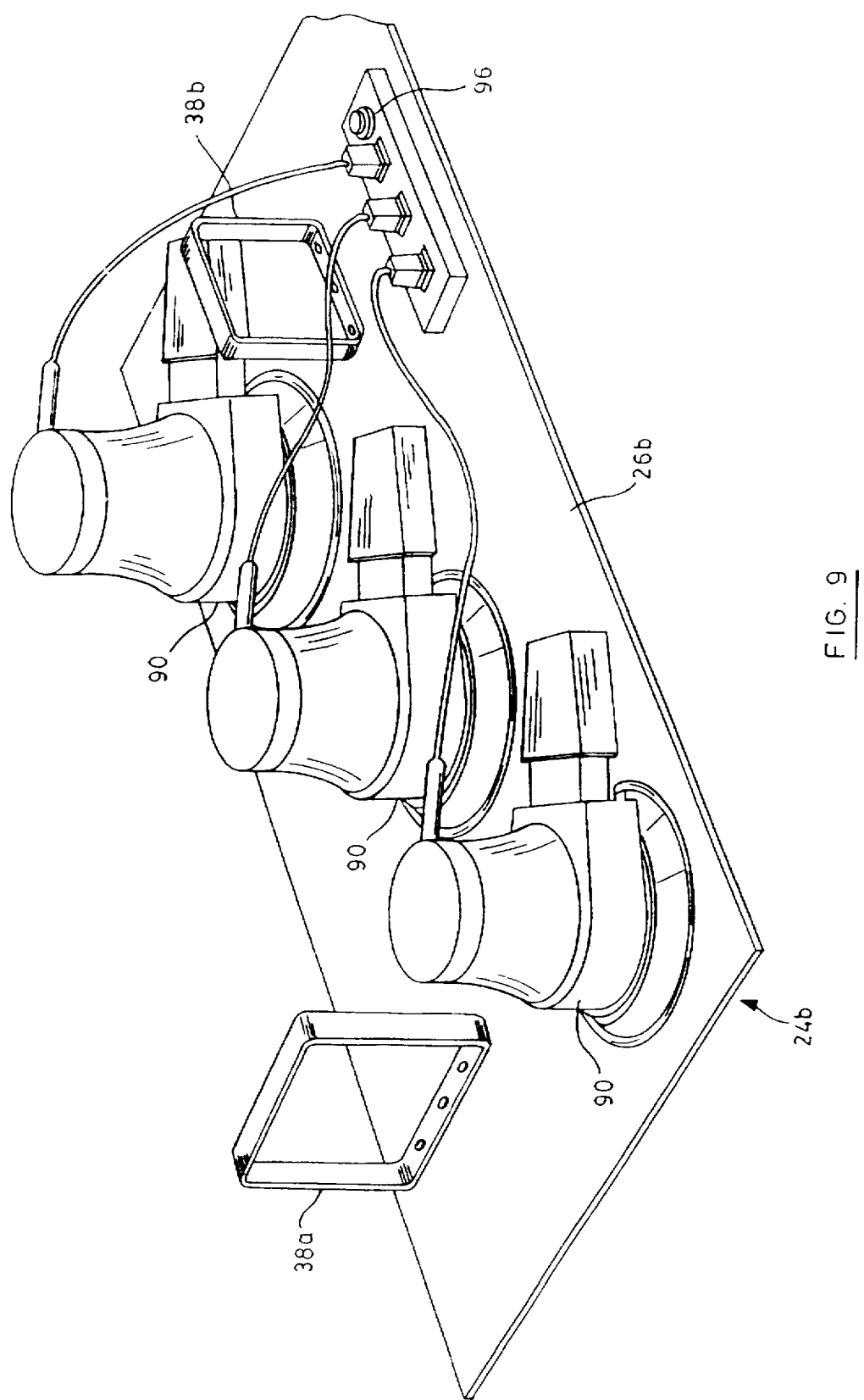
FIG. 9 is a perspective view of an alternative embodiment utilizing routers in place of the planers of FIG. 1.

As shown in FIG. 9, the mounting member 24b may also be utilized to support a plurality of orbital sanders with the apertures circular to accommodate the orbital heads and adjustable clamps 90 secured to the upper surface 26b and around the bodies of the sanders. In this way, the sanders are supported in the apertures and may be moved through the provision of a pair of handles 38a,38b over the entire surface. It will also be noted for FIG. 9 that a common power bar is provided on the upper surface 26 with a single switch 96 to control power to the sanders.

I claim:

1. A support to mount a plurality of portable machine tools in a ganged array for conjoint operation on a workpiece, said support comprising a generally planar mounting member having an upper surface to receive said tools and a lower surface engageable with a workpiece, a plurality of apertures in said mounting member, one associated with each of said tools to permit access of a tool bit associated with a tool to said workpiece, and a retainer to secure releasably said tools to said member.

2. A support according to claim 1 wherein a handle is secured to said mounting member for manipulation thereof.

3. A support according to claim 1 wherein a fence is located adjacent one edge of said member and is adjustable relative thereto to guide said member on said workpiece.

4. A support according to claim 1 wherein said retainer includes a plurality of screws passing through said member to be received in said tool.

5. A support according to claim 1 wherein said lower surface is relieved between a leading edge and said aperture to provide access to said tool bits.

6. A support according to claim 1 wherein said apertures are laterally and longitudinally spaced from one another.

7. A support according to claim 6 wherein a pair of said apertures are longitudinally aligned and laterally spaced and at least one other aperture is positioned between said apertures and longitudinally spaced therefrom.

* * * * *